(12) United States Patent
Kang

(10) Patent No.: US 10,852,403 B2
(45) Date of Patent: Dec. 1, 2020

(54) 3D SCAN TUNING

(71) Applicant: Hewlett-Packard Development Company, L.P., Houston, TX (US)

(72) Inventor: Jinman Kang, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 265 days.

(21) Appl. No.: 15/557,611

(22) PCT Filed: Jun. 10, 2015

(86) PCT No.: PCT/US2015/035167
§ 371 (c)(1),
(2) Date: Sep. 12, 2017

(87) PCT Pub. No.: WO2016/200383
PCT Pub. Date: Dec. 15, 2016

(65) Prior Publication Data
US 2018/0059226 A1    Mar. 1, 2018

(51) Int. Cl.
*G01S 7/486*    (2020.01)
*G01S 17/89*    (2020.01)
*G01S 7/48*    (2006.01)

(52) U.S. Cl.
CPC .............. *G01S 7/4868* (2013.01); *G01S 7/48* (2013.01); *G01S 17/89* (2013.01)

(58) Field of Classification Search
CPC ................................ G01S 7/4868; G01S 17/89
USPC ....................... 356/3.01–5.15, 4.01
See application file for complete search history.

(56) References Cited

U.S. PATENT DOCUMENTS

| 5,231,401 | A | * | 7/1993 | Kaman | .................. | G01S 17/89 |
|---|---|---|---|---|---|---|
| | | | | | | 250/332 |
| 5,511,148 | A | | 4/1996 | Wellner | | |
| 6,572,018 | B1 | | 6/2003 | Lucera et al. | | |
| 7,907,167 | B2 | | 3/2011 | Vesely et al. | | |
| 8,085,388 | B2 | * | 12/2011 | Kaufman | ............... | G03B 21/28 |
| | | | | | | 356/5.01 |

(Continued)

FOREIGN PATENT DOCUMENTS

| TW | 201240448 A1 | 1/2001 |
|---|---|---|
| WO | WO-2009/120073 A2 | 10/2009 |
| WO | WO-2014/165343 A2 | 10/2014 |

OTHER PUBLICATIONS

Kipp Bradford, "Touring the Future With Texas Instruments," Jun. 27, 2012, pp. 1-11, Make: , https://makezine.com/2012/06/27/innovate-the-future-with-texas-instruments/.

*Primary Examiner* — Daniel L Murphy
(74) *Attorney, Agent, or Firm* — HP Inc. Patent Department

(57) ABSTRACT

Examples relate to three-dimensional (3D) scan tuning. In some examples, preliminary scan data is obtained while the real-world object is continuously rotated in view of a 3D scanning device, where the 3D scanning device performs a prescan to collect the preliminary scan data. The preliminary scan data is then used to determine physical characteristics of the real-world object, and a camera operating mode of the 3D scanning device is modified based on the physical characteristics. At this stage, 3D scan data for generating a 3D model of the real-world object is obtained, where the 3D scanning device scans the real-world object according to the camera operating mode.

15 Claims, 3 Drawing Sheets

(56) References Cited

U.S. PATENT DOCUMENTS

| | | |
|---|---|---|
| 8,118,438 B2 | 2/2012 | Daniel et al. |
| 8,386,918 B2 | 2/2013 | Do et al. |
| 8,416,236 B1 | 4/2013 | Hickman et al. |
| 8,584,996 B2 | 11/2013 | Pegatron |
| 8,837,026 B2 | 9/2014 | Fisker et al. |
| 8,848,201 B1* | 9/2014 | Bruce ............... G01B 21/047 356/601 |
| 8,932,058 B2 | 1/2015 | Fisker et al. |
| 9,482,529 B2* | 11/2016 | Becker ............... G01B 11/245 |
| 2012/0044476 A1* | 2/2012 | Earhart ............... G01S 3/7867 356/4.01 |
| 2014/0022248 A1 | 1/2014 | Kuffner, Jr. et al. |
| 2015/0109419 A1 | 4/2015 | Vollrath et al. |

\* cited by examiner

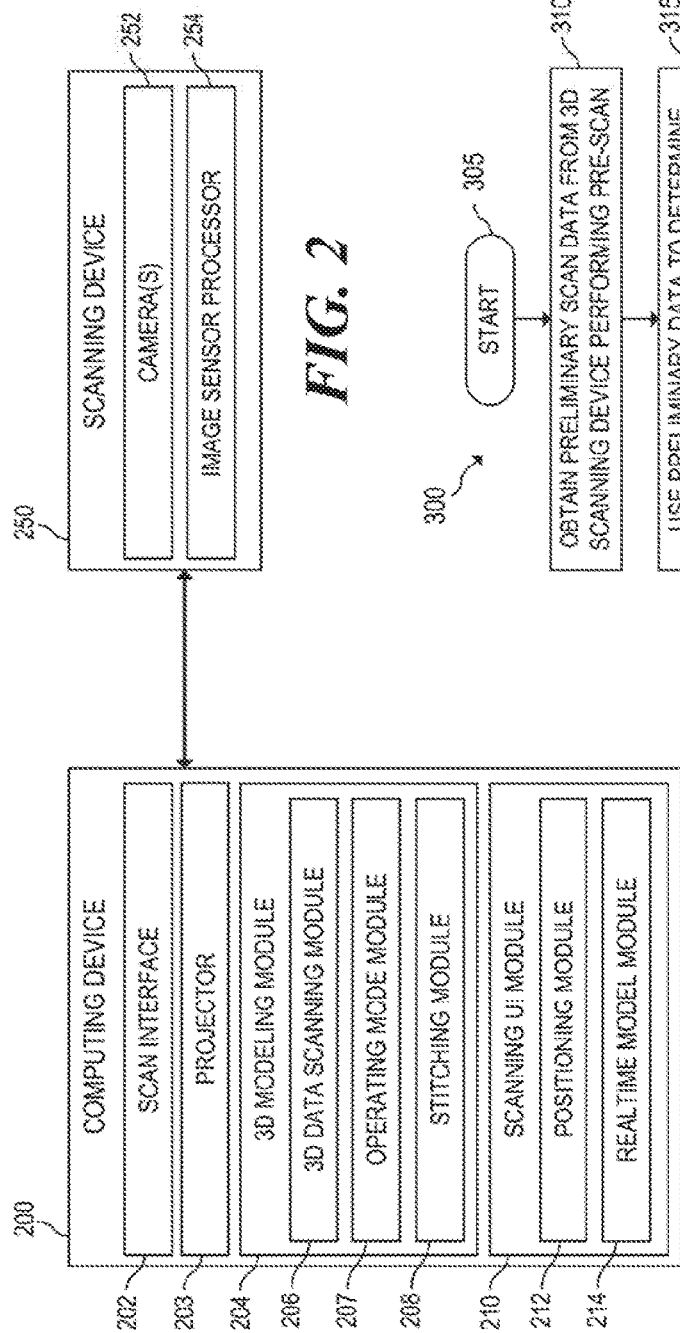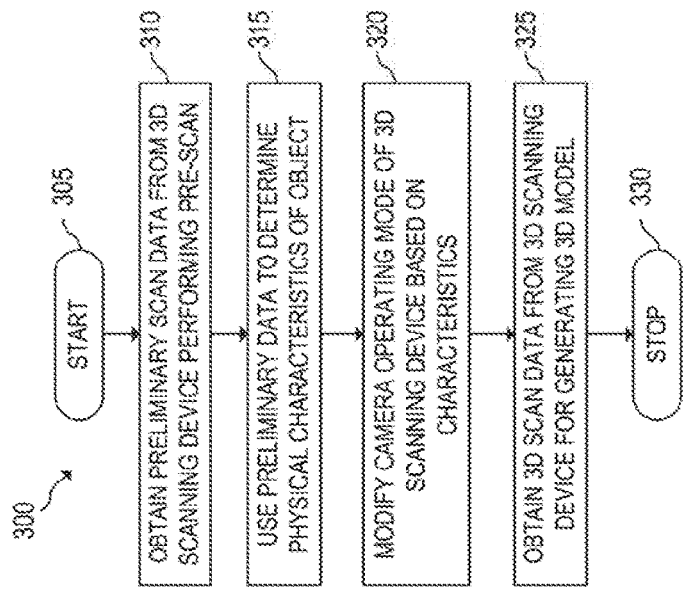

3D SCAN TUNING

BACKGROUND

A three-dimensional (3D) model of an object has many uses. A 3D model can be used in a variety of applications including, but not limited to, movie and video game assets, medical orthotics and prosthetics, industrial design, etc.

BRIEF DESCRIPTION OF THE DRAWINGS

The following detailed description references the drawings, wherein:

FIG. 2 is a block diagram of an example computing device in communication with a scanning device for 3D scan tuning;

FIG. 3 is a flowchart of an example method for execution by a computing device for 3D scan tuning.

DETAILED DESCRIPTION

A capture system may be used to digitally capture data related to the shape and appearance of a real-world object. The captured data can then be used to construct a three-dimensional (3D) model of the object. Different techniques can be used to collect data related to the shape of a real-world object such as contact scanners, time-of-flight laser scanners, triangulation laser scanners, structured light scanners, etc. For example, a hand-held device can be used to collect shape data by making distance measurements while the hand-held device is repositioned. In this example, the hand-held device tracks its position using an internal coordinate system, which is used to reference the distance measurements.

Examples herein describe 3D scan tuning that adjust parameters of a scanning device and/or projector based on a prescan. The prescan allows the scanning software to determine physical characteristics (e.g., lighting, brightness, coloring, shape, luster, etc.) of the real-world object to be scanned. Based on the physical characteristics, the parameters of the scanning device and/or projector are modified to optimize a subsequent 3D scan.

In some examples, preliminary scan data is obtained while the real-world object is continuously rotated in view of a 3D scanning device, where the 3D scanning device performs a prescan to collect the preliminary scan data. The preliminary scan data is then used to determine physical characteristics of the real-world object, and a camera operating mode of the 3D scanning device is modified based on the physical characteristics. At this stage, 3D scan data for generating a 3D model of the real-world object is obtained, where the 3D scanning device scans the real-world object according to the camera operating mode.

Figure 1:
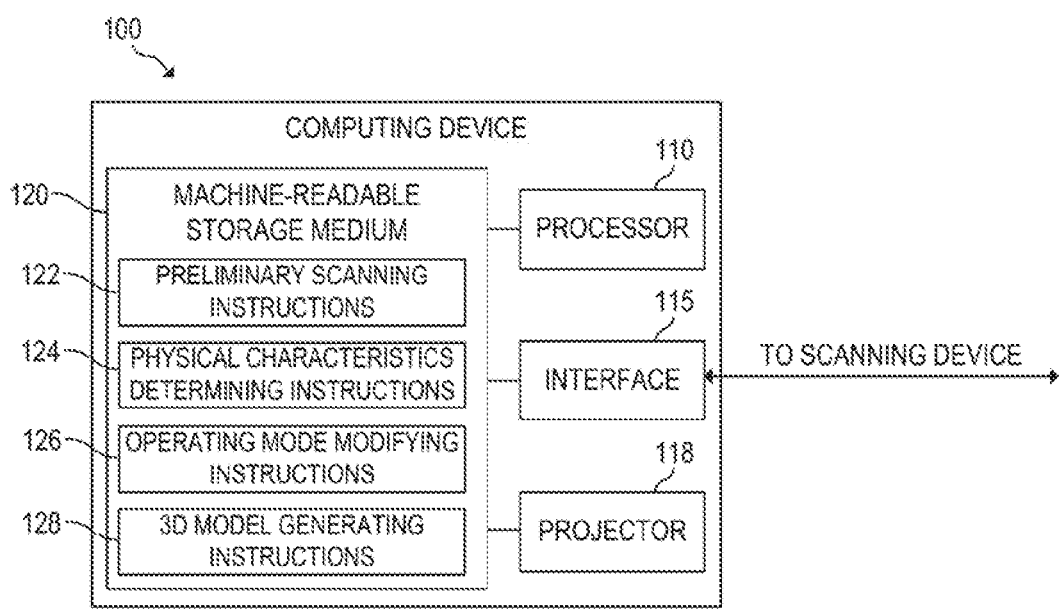
FIG. 1 is a block diagram of an example computing device for 3D scan tuning.

Referring now to the drawings, FIG. 1 is a block diagram of an example computing device 100 for 3D scan tuning. Computing device 100 may be any computing device (e.g., smartphone, tablet, laptop computer, desktop computer, etc.) with access to a scanning device. In the embodiment of FIG. 1, computing device 100 includes a processor 110, an interface 115, a projector 118, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to enable 3D scan tuning. As an alternative or in addition to retrieving and executing instructions, processor 110 may include one or more electronic circuits including a number of electronic components for performing the functionality of one or more of instructions 122, 124, 126, 128.

Interface 115 may include a number of electronic components for communicating with a scanning device. For example, interface 115 may be an Ethernet interface, a Universal Serial Bus (USB) interface, an IEEE 1394 (Firewire) interface, an external Serial Advanced Technology Attachment (eSATA) interface, or any other physical connection interface suitable for communication with the scanning device. Alternatively, interface 115 may be a wireless interface, such as a wireless local area network (WLAN) Interface or a near-field communication (NFC) interface. In operation, as detailed below, interface 115 may be used to send and receive data to and from a corresponding interface of the scanning device.

Projector 118 is an optical device for projecting images onto a surface. For example, projector 118 may be an embedded light source, a laser, video projector, or any other optical device suitable for projecting images.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for 3D scan tuning.

Preliminary scanning instructions 122 use a scanning device via interface 115 to perform a preliminary scan (i.e., prescan). During a prescan, the scanning device quickly scans the object while the object is rotated 360 degrees. The prescan is used to obtain preliminary scan data for creating a preliminary object model, which can be used to generate a rough 3D model of the object. Preliminary texturing of the model can be based on imagery of the surface of the real-world object.

Physical characteristics determining instructions 124 determine physical characteristics of the real-world object based on the prescan results. For example, the texturing of the preliminary model can be analyzed to determine the lighting, brightness, coloring, and/or luster of the real-world object. In this example, the preliminary model can also be analyzed to determine the general shape (e.g., flat, sphere, irregular, humanoid, rectangular, etc.) of the real-world object.

Operating mode modifying instructions 126 modify an operating mode of the scanning device based on the physical characteristics. Specifically, an operating mode of a camera in scanning device can be modified to optimally capture 3D data of a real-world object with the determined physical characteristics. For example, if the brightness of the real-world object is low, the operating mode of the camera can be modified to a low light operating mode. In another example, if the real-world object has high luster, the operating mode of the camera can be modified to a lustrous object operating mode. In yet another example, if the real-world object is flat, the operating mode of the camera can be modified to a flat object operating mode that uses a different alignment algorithm for stitching the 3D model together.

3D model generating instructions 128 obtain 3D data according to the operating mode of the scanning device and generate a 3D model. Because the operating mode is optimized for the physical characteristics of the real-world object, the 3D data is high quality and results in a better 3D model. For example, a low light operating mode allows for additional details of the real-world to be captured when the surface of the object has low brightness.

FIG. 2 is a block diagram of an example computing device 200 in communication via a network 245 with a scanning device 250. As illustrated in FIG. 2 and described below, computing device 200 may communicate with scanning device 250 to perform 3D scan tuning.

As illustrated, computing device 200 may include a number of modules 202-214, while scanning device 250 may include a number of modules 252-254. Each of the modules may include a series of instructions encoded on a machine-readable storage medium and executable by a processor of the respective device 200, 250. In addition or as an alternative, each module may include one or more hardware devices including electronic circuitry for implementing the functionality described below.

As with computing device 100 of FIG. 1, computing device 200 may be a smartphone, notebook, desktop, tablet, workstation, mobile device, or any other device suitable for executing the functionality described below. As detailed below, computing device 200 may include a series of modules 202-214 for enabling 3D scan tuning.

Scan interface 202 may manage communications with the scanning device 250. Specifically, the scan interface 202 may initiate connections with the scanning device 250 and then send or receive scan data to/from the scanning device 250.

Projector 203 projects visual cues on and about a real-world object. For example, projector 203 can include light emitting diodes (LED's) for providing visual cues (i.e., scanned orientations, next orientation for scan cycle, etc.) during a scanning cycle. Scanning UI module 210 may use projector 203 during the scanning process to instruct a user on positioning the real-world object.

3D modeling module 204 may process scan data of scanning device 250 to generate 3D models. Although the components of 3D modeling module 204 are described in detail below, additional details regarding an example implementation of 3D modeling module 204 are provided above in connection with instructions 122 and 126 of FIG. 1.

3D data scanning module 206 obtains and processes scan data from scanning device 250. As the real-world object is repositioned, 3D data scanning module 206 can direct scanning device 250 to perform a 3D scan. The 3D scan can be performed as the object is rotated to different positions so that all sides of the real-world object can be scanned. For example, to scan the object in 3D, the scanning device 250 can project structured visible light and/or structured infrared light in a sequence of patterns on the object and capture and analyze the reflected light. The distortion of the structured light patterns on the object is then used to calculate the shape, depth and texture of the object. Scanning device 250 can also capture an image of the object to apply as surface texture for the model that is generated. In this example, the 3D data can be collected using scanning device 250 and projector 203, which may be operating according to parameters set by operating mode module 207 as described below.

3D data scanning module 206 can also use scanning device 250 to perform a prescan. During a prescan, scanning device 250 quickly scans the object while rotating it 360 degrees. The quick scan is used to obtain preliminary scan data for creating a preliminary object model, which can be used by 3D data scanning module 206 to determine physical characteristics (e.g., brightness, luster, general shape, etc.) of the real-world object.

Operating mode module 207 adjusts parameters of scanning device 250 and projector 203 based on physical characteristics determined by 3D data scanning module 206. Specifically, settings (e.g., gain, exposure, white balance) of an image sensor processor (ISP) 254 of scanning device 250 can be customized based on the physical characteristics. For example, the gain of ISP 254 can be modified based on the brightness of the real-world object in the preliminary model. In another example, the white balance of ISP 254 can be modified based on the coloring of the real-world object in the preliminary model. The settings of ISP 254 can be set by specifying an operating mode for the camera 252 such as a low light operating mode (e.g., increased gain), a flat object operating mode, and a lustrous object operating mode (e.g., noise reduction). In this example, the updated settings may allow scanning device 250 to produce a higher resolution texture and a higher quality scan for the resulting 3D model.

Operating mode module 207 can also set operating parameters of projector 203. Operating parameters of projector 203 include a projection pattern, a projection color, and a projection intensity. For example, if the real-world object is predominantly white, operating mode module 207 can change the projection color from white to green. In another example, if the real-world object has a surface pattern that would interfere with a star-field projection, operating mode module 207 can change the projection pattern to a grid projection pattern. Various combinations of the operating parameters can be modified (e.g., projection pattern and color, projection intensity and color, etc.) by operating mode module 207.

Stitching module 208 creates 3D models based on the scan data obtained by 3D data scanning module 206. For example, stitching module 208 can stitch together scan passes of 3D scan data to create a full 3D model of a real-world object, where each scan pass is of the real-world object in a different position. Each scan pass can be stitched by stitching module 208 to previous scan pass as it is obtained by 3D data scanning module 206. In this example, the scan passes can be analyzed to identify distinctive features of the object for overlaying the scan passes at the appropriate points. After all the scan passes are stitched, a full 3D model of the real-world object is created.

Scanning UI module 210 presents a user interface for performing a 3D scan of a real-world object (i.e., a user interface of a 3D scanning application). Although the components of scanning UI module 210 are described in detail below, additional details regarding an example implementation of scanning UI module 210 are provided above in connection with instructions 124 of FIG. 1.

Positioning module 212 can use projector 203 to provide visual cues as the object is repositioned for scanning. After 3D data scanning module 206 performs the prescan, positioning module 212 can provide the visual cues directly on the object and the surface surrounding it. The visual cues can be updated by positioning module 212 as the scan passes are performed. For example, completed scan passes can be identified on the surface, and the position of the object for the next scan pass can also be shown.

Real-time model module 214 can show a real-time representation of the object (e.g., image stream from a camera) while a scan is being performed. As each scan pass is completed and the model is updated, the real-time representation can be updated to reflect new details from the scan pass. Real-time model can also allow the user to reposition the model in the user interface so that all sides of the model can be examined.

Scanning device 250 can be a peripheral or integrated component of computing device 200. Scanning device 250 is any device suitable of capturing 3D data such as a structured light camera device, a laser scanner, etc. As detailed below, scanning device 250 may include a series of modules 252-254 for capturing 3D data.

In FIG. 2, scanning device 250 includes camera(s) 252 for capturing structured light. For example, camera(s) 252 can include a combination of standard and infrared cameras, where a standard camera is used to capture texturing on the surface of the object and an infrared camera is used to capture shape data. The infrared camera can analyze a pattern of structured infrared light (e.g., star field, etc.) projected on the surface of the object to obtain the shape data. In this case, the structured infrared light can be projected by projector 203.

Scanning device 250 also includes ISP 254 for processing the imagery and 3D data captured by camera(s) 252. Image sensor processor 254 can perform various functions such as apply color filters, apply demosaicing algorithms, reduce noise, image sharpening, etc.

FIG. 3 is a flowchart of an example method 300 for execution by a computing device 100 for 3D scan tuning. Although execution of method 300 is described below with reference to computing device 100 of FIG. 1, other suitable devices for execution of method 300 may be used, such as computing device 200 of FIG. 2. Method 300 may be implemented in the form of executable instructions stored on a machine-readable storage medium, such as machine-readable storage medium 120, and/or in the form of electronic circuitry.

Method 300 may start in block 305 and continue to block 310, where computing device 100 uses a scanning device to perform a preliminary scan (i.e., prescan). The prescan is used to obtain preliminary scan data for creating a preliminary object model, which can be used to generate a rough 3D model of the object. In block 315, computing device 100 determines physical characteristics of the real-world object based on the prescan results. For example, a preliminary object model can be analyzed to determine the general shape, brightness, coloring, and/or luster of the real-world object.

In block 320, computing device 100 modifies an operating mode of the scanning device based on the physical characteristics. Examples of camera operating modes include but are not limited to a low light operating mode, a flat object operating mode, a lustrous object operating mode, etc. In block 325, computing device 100 obtains 3D data according to the operating mode of the scanning device and generates a 3D model. Because the operating mode is optimized for the physical characteristics of the real-world object, the 3D data is high quality and results in a better 3D model. Method 300 may subsequently proceed to block 330, where method 300 may stop.

Figure 4:
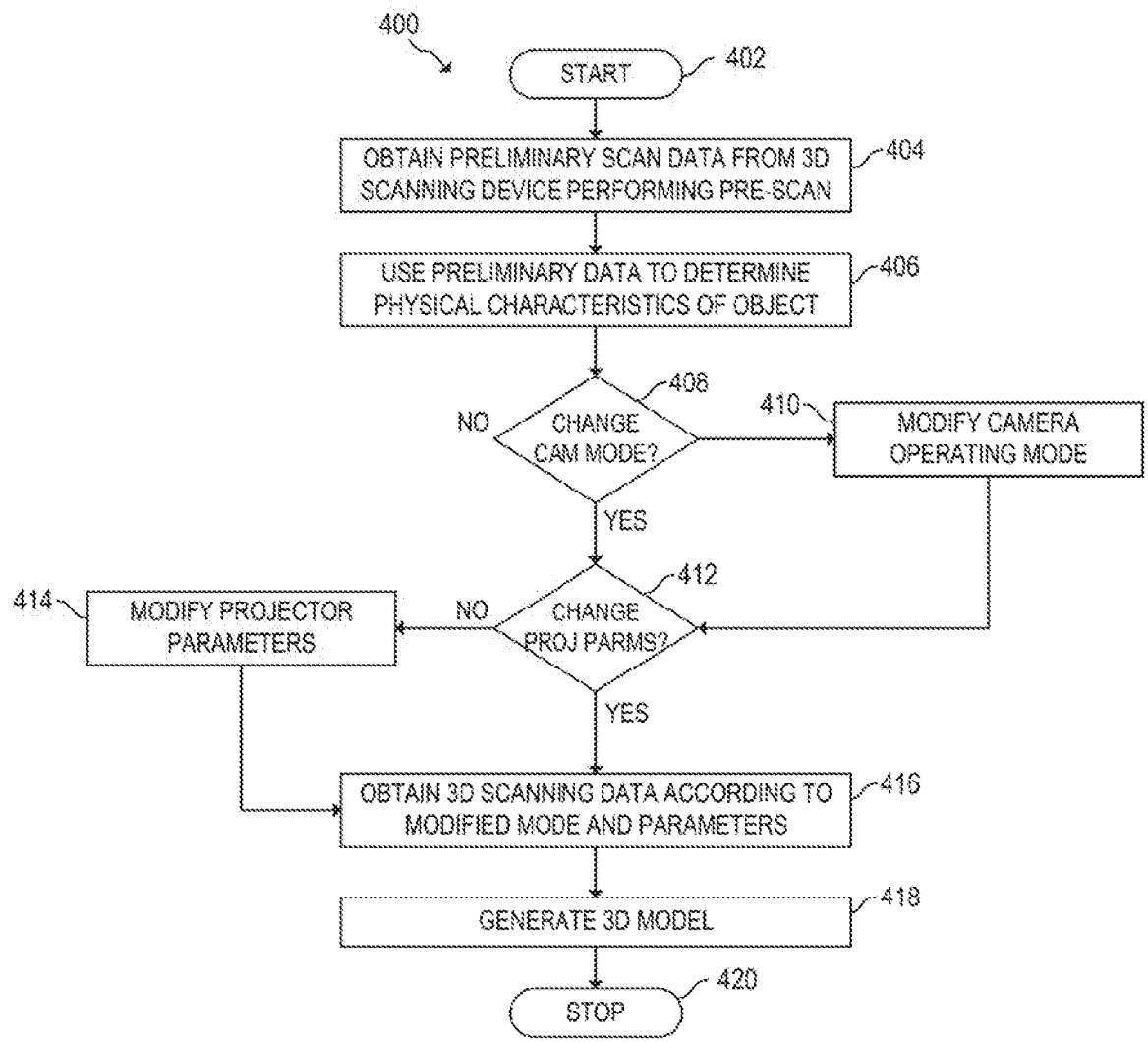
FIG. 4 is a flowchart of an example method for execution by a computing device for tuning a scanning device and a projector during a 3D scan.

FIG. 4 is a flowchart of an example method 400 for execution by a computing device 100 for tuning a scanning device and a projector during a 3D scan. Although execution of method 400 is described below with reference to computing device 100 of FIG. 1, other suitable devices for execution of method 400 may be used, such as computing device 200 of FIG. 2. Method 400 may be implemented in the form of executable instructions stored on a machine-readable storage medium, such as machine-readable storage medium 120, and/or in the form of electronic circuitry.

Method 400 may start in block 402 and continue to block 404, where computing device 100 uses a 3D scanning device to obtain a preliminary scan data for a real-world object, which can be used to create a preliminary model of the real-world object. In block 406, computing device 100 uses the preliminary scan data to determine physical characteristics of the real-world object. For example, preliminary scan data can be analyzed to determine the general shape, brightness, coloring, and/or luster of the real-world object.

In block 408, computing device 100 may determine if the operating mode of the camera should be updated. For example, computing device 100 can determine that the operating mode should be updated based on the brightness of the real-world object in the preliminary model. If computing device 100 determines that the operating mode should be updated, the operating mode of the camera is updated based on the physical characteristics in block 410. In this example, computing device 100 can change the operating mode of the camera to a low light mode.

If computing device 100 determines that the operating mode should not be updated, method 400 proceeds to block 412, where computing device 100 determines if the operating parameters of the projector should be updated. For example, computing device 100 can determine that the operating parameters of the projector should be updated based on the coloring of the real-world object in the preliminary model. If computing device 100 determines that the operating parameters of the projector should be updated, the operating parameters of the projector are updated in block 414. In this example, computing device 100 can update projection color of the projector to a color that does not conflict with the coloring of the real-world object. In another example, the projector intensity (i.e., brightness) can be increased to prevent interference caused by ambient light.

In block 416, computing device 100 obtains 3D data according to the operating mode of the scanning device and the operating parameters of the projector. Because the operation of the scanning device and the projector are optimized for the physical characteristics of the real-world object, the 3D data is higher quality (e.g., higher resolution, accurate colors, improved contrast, etc.) In block 418, computing device generates a 3D model based on the 3D data. Method 400 may subsequently proceed to block 420, where method 400 may stop.

The foregoing disclosure describes a number of examples for 3D scan tuning. In this manner, the examples disclosed herein improve 3D data capture for a real-world object by modifying operating parameters of a scanning device and/or a projector based on a prescan of the real-world object.

I claim:

1. A computing device comprising:
   an interface to interact with a three-dimensional (3D) scanning device;
   a processor to:
   obtain preliminary scan data of a real-world object captured by a camera of the 3D scanning device during a prescan of the real-world object;
   use the preliminary scan data to determine physical characteristics of the real-world object;
   modify an operating mode of the camera of the 3D scanning device to adjust a setting of an image sensor processor of the camera to adapt image processing functions of the image sensor processor to the determined physical characteristics for a rescan of the real-world object with the camera;

update, for a projector that projected visual cues directly on and around the real-world object during the preliminary scan, projector operating parameters for the rescan of the real-world object with the camera based on the determined physical characteristics;

obtain 3D rescan data of the real-world object captured from the rescan of the real-world object by the camera utilizing the modified operating mode and the projector utilizing the updated projector operating parameters; and generate a 3D model of the real-world object from the obtained 3D rescan data.

2. The computing device of claim 1, wherein the processor is further to:

use the projector to project the visual cues during the rescan according to the projector operating parameters.

3. The computing device of claim 2, wherein the projector operating parameters include at least one selected from a group consisting of a selected projection pattern, a projection color, and a projection intensity.

4. The computing device of claim 3, wherein the physical characteristics include an ambient light on the real-world object during the prescan, and wherein the projection intensity is increased to prevent interference by the ambient light during the rescan.

5. The computing device of claim 1, wherein the camera operating mode is one selected from a group consisting of a low light operating mode, a flat object operating mode, and a lustrous object operating mode.

6. The computing device of claim 1, wherein the physical characteristics include a brightness of the real-world object, and wherein the camera operating mode is modified to increase a gain of the 3D scanning device.

7. A method comprising:

obtaining preliminary scan data of a real-world object captured with a camera and a projector of a 3D scanning device, during a prescan of the real-world;

using the preliminary scan data to determine physical characteristics of the real-world object;

modifying an operating mode of the camera of the 3D scanning device to adjust a setting of an image sensor processor of the camera to adapt data interpretation by the image sensor processor to the determined physical characteristics for a rescan of the real-world object with the camera and the projector;

updating projector operating parameters of the projector to alter an output of the projector to adapt the projector to the determined physical characteristics for the rescan of the real-world object with the camera and the projector;

obtaining 3D rescan data of the real-world object captured from a rescan of the real-world object performed by the camera utilizing the modified operating mode and the projector with the updated projector operating parameters; and generating a 3D model of the real-world object from the obtained 3D rescan data.

8. The method of claim 7, wherein the projector operating parameters include at least one selected from a group consisting of a selected projection pattern, a projection color, and a projection intensity.

9. The method of claim 8, wherein the physical characteristics include an ambient light on the real-world object during the prescan, and wherein the projection intensity is increased prevent interference by the ambient light during the rescan.

10. The method of claim 7, wherein the camera operating mode is one selected from a group consisting of a low light operating mode, a flat object operating mode, and a lustrous object operating mode.

11. The method of claim 7, wherein the physical characteristics include a brightness of the real-world object, and wherein the camera operating mode is modified to increase a gain of the 3D scanning device.

12. A non-transitory machine-readable storage medium encoded with instructions executable by a processor to:

obtain preliminary scan data of a real-world object captured with a camera and a projector of a 3D scanning device during a prescan of the real-world object;

use the preliminary scan data to determine physical characteristics of the real-world object;

modify an operating mode of the camera of the 3D scanning device to adjust a setting of an image sensor processor of the camera to adapt data interpretation by the image sensor processor to the determined physical characteristics for a rescan of the real-world object with the camera, wherein the camera operating mode is one selected from a group consisting of a low light operating mode, a flat object operating mode, and a lustrous object operating mode;

update projector operating parameters of the projector to alter an output of the projector to adapt to the determined physical characteristics for the rescan of the real-world object with the camera and the projector, wherein the projector operating parameters include at least one selected from a group consisting of a selected projection pattern, a projection color, and a projection intensity;

obtain 3D rescan data of the real-world object captured from the rescan, of the real-world object by the camera utilizing the modified operating mode and the projector utilizing the updated projector operating parameters; and generate a 3D model of the real-world object from the obtained 3D rescan data.

13. The machine-readable storage medium of claim 12, wherein the physical characteristics include a brightness of the real-world object, and wherein the camera operating mode is modified to increase a gain of the 3D scanning device.

14. The machine-readable storage medium of claim 12, wherein the physical characteristics include an ambient light on the real-world object during the prescan, and wherein the projection intensity is increased to prevent interference by the ambient light during the rescan.

15. The machine-readable storage medium of claim 12, wherein the projector is to project visual cues according to the projector operating parameters for repositioning the real-world object while the 3D scan data is obtained.

* * * * *